Nov. 4, 1969  E. SIRTL ET AL  3,476,640
SMOOTH SURFACED POLYCRYSTALS
Filed July 29, 1965  2 Sheets-Sheet 1

United States Patent Office 3,476,640
Patented Nov. 4, 1969

3,476,640
SMOOTH SURFACED POLYCRYSTALS
Erhard Sirtl and Hartmut Seiter, Munich, Germany, assignors to Siemens Aktiengesellschaft, Erlangen, Germany, a corporation of Germany
Filed July 29, 1965, Ser. No. 475,663
Claims priority, application Germany, Aug. 4, 1964,
S 92,455
Int. Cl. B32b 5/16, 1/00
U.S. Cl. 161—164         15 Claims

ABSTRACT OF THE DISCLOSURE

The present invention relates to a method of producing smooth polycrystalline silicon in the form of thin, shiny layers. This silicon is so characterized that there are fine particles of silicon carbide and/or carbon between arbitrarily oriented silicon crystallites, so that the physical properties of the produced layers are independent upon direction. The method is characterized by the fact that a reaction mixture, which contains either a compound comprised of silicon and carbon or a mixture of a carbon and silicon containing compound, is pyrolitically dissociated and that silicon carbide or carbon particles are precipitated in small amounts, together with the silicon. The reaction temperature is kept at a value at which the formation of silicon carbide begins.

---

Our invention relates to smooth surfaced polycrystals, and more particularly to polycrystals of silicon and the like which have smooth, texture-free surfaces, and to the methods of producing the same. Still more particularly, our invention relates to the production of lustrous, smooth thin layers primarily of silicon which contain embedded between randomly arranged and irregularly oriented silicon crystals finely divided particles of silicon carbide and/or carbon, and whose physical properties from the macroscopic standpoint are independent thereof.

The hitherto known method of producing thin polycrystalline layers, wherein a semiconductor layer is evaporated onto an insulator, exhibit numerous disadvantages. The precipitated polycrystals which make up the semiconductor layer exhibit numerous strong granular effects, so that the same are unsuitable for the production of semiconductor devices. Moreover, it is necessary for the production of monocrystalline semiconductor layers by epitaxial growth to use a monocrystalline underlayer of the same material, or of a material which the same lattice structure and practically the same lattice constants.

It is accordingly a primary object of our invention to provide for polycrystalline structures which avoid the above enumerated difficulties.

It is another object of our invention to provide a method of producing polycrystalline structures which avoids the above enumerated difficulties.

It is yet another object of our invention to provide for the production of polycrystalline structures which to a great extent exhibit the properties of monocrystals, and furthermore to provide for the production of such materials by separation out of the gas phase and precipitation on any base.

As still a further object, our invention provides for the production of polycrystalline structures which can be used for semiconductor devices, and which are obtained without the need for epitaxial growth on a monocrystalline underlayer.

Other objects and advantages of our invention will be apparent from a further reading of the specification and of the appended claims.

With the above and other objects in view, our invention mainly comprises a body formed of a plurality of randomly oriented crystals, particularly of silicon, with spaces therebetween, and particles of a substance selected from the group consisting of silicon carbide and carbon filling the spaces, the surface of the polycrystalline body being smooth and uninterrupted and being partly made up of exposed faces of the crystals of the polysilicon and partly made up of the silicon carbide or carbon particles embedded between the crystals.

The method of producing smooth surfaced polycrystalline bodies, particularly in the form of lustrous thin layers of silicon with randomly oriented silicon crystals between which are embedded finely divided particles of silicon carbide and/or carbon by separation of the crystals from the gas phase, mainly comprises simultaneously precipitating silicon carbide along with the silicon by using a silicon- and carbon-containing reaction gas, using as carrier for the layer to be separated a heatable base, and adjusting the separation temperature and concentration of reactants in the reaction gas to such values that the silicon carbide formation is kept at a minimum so that only traces of silicon carbide and/or carbon are separated from the gas.

In order to obtain an optimum yield according to this reaction, it is necessary that the precipitation temperature be adjusted, depending upon the composition of the reaction mixture, at such temperature that the beginning of the silicon carbide precipitation is dependent upon the composition of the reaction gas mixture. Under the term "beginning of the silicon carbide formation" it should be understood that roentgenographically smooth still measurable amounts of silicon carbide together with silicon precipitates from the reaction gas mixture. It is important to maintain the conditions such that a spontaneous start of the silicon carbide formation does not occur under the selected reaction conditions.

It is advantageous that the reaction gas employed contain hydrogen, silicon, carbon and a halogen. It is thus possible to use either a mixture of hydrogen or inert gas and a mixed carbon- and silicon-containing halogen compound, such as $CH_3SiHCl_2$, or a reaction gas consisting of a mixture of hydrogen or inert gas and halogen compounds or halogen hydride compounds of silicon and carbon, for example a mixture of hydrogen, $SiHCl_3$ and $CH_2Cl_2$.

According to a particular embodiment of our invention, the volume ratio of starting compounds is so adjusted that the proportion of silicon-containing compound amounts to about four times that of the carbon-containing compound, for example to use $SiHCl_3$ and $CH_2Cl_2$ in a ratio of 10:1. Because of the high activation energy of reactions of silicon carbide compounds, upon the thermal decomposition of organochlorosilanes, for example $CH_3SiHCl_2$, below a specific temperature range, for example about 1000° C., practically pure silicon is obtained, whereas above a specific temperature range, for example about 1300° C., practically pure silicon carbide is precipitated. In the range therebetween we have found that it is possible to obtain silicon together with silicon carbide from the gas reaction mixture.

It is of course possible to use instead of chlorine compounds other halogen compounds such as $SiBr_4$ or $CHBr_3$.

As base on which the precipitation takes place it is possible to use bodies of any geometric shape, particularly little plates or discs of heat-resistant material, for example of insulating material such as corundum, apparatus porcelain, or quartz, or of metals such as molybdenum, tantalum or the like, or also of semiconductor materials, such as of silicon carbide or silicon.

To produce thin, carrier-free layers, it is particularly suitable to use quartz glass as the base which after the forming of the layer thereof is dissolved out with concentrated hydrofluoric acid.

The precipitation is preferably carried out according to our invention at a temperature of about 1000–1200° C., and most preferably at a temperature of about 1050–1150° C.

It has been found that the smooth polycrystalline bodies of silicon obtained by the simultaneous precipitation of silicon and silicon carbide, to a great extent correspond in many properties to bodies of monocrystalline silicon. They can, for example, by methods known in the semiconductor art, such as etching, oxidation, alloying, diffusion, contacting, or the like, be further worked up, so that they are suitable for many known semiconductor devices such as transistors, rectifiers or the like. Silicon layers of this type can, for example, be further worked up by known methods of planar technology.

The possibility according to our invention of producing layers of any desired geometric shape is particularly advantageous for the production of solid state electrical circuits. In addition, the materials of our invention can be used for the production of pressure responsive devices, for example tension measuring strips, microphones and the like, because it is not necessary as a result of the direction-independence of the electrical properties to produce crystals of specific crystallographic orientation. Moreover, the precipitation can be achieved to provide homogeneous thickness on various bases, so that the geometric measurement requirements can be met without difficulty.

It is also possible according to our invention to produce silicon in compact form, although the invention is particularly advantageous in connection with the production of thin layers. For the production of compact silicon or for the production of thick layers, the considerably increased speed of growth can be favorably used without a damage to the properties of the material.

The silicon produced according to our invention differs considerably from the material obtained at about 400° C. to 500° C. by thermal decomposition of silanes or silicon subchlorides which precipitate in the form of little mirror-like crystals. The silicon which precipitates at the lower temperature exhibits at the boundaries of the silicon-crystals an enriching of oxygen (oxide), which considerably influences the electrical properties. In contrast thereto, according to our invention the layers which are produced do not conttain any oxygen, since at a precipitation temperature of between 1000° C. and 1200° C., the SiO-partial pressure is so great that it is not possible for the oxygen concentration to build up in the precipitated layers.

The invention is more fully illustrated by way of example in the accompanying drawings, in which.

Figure 1:
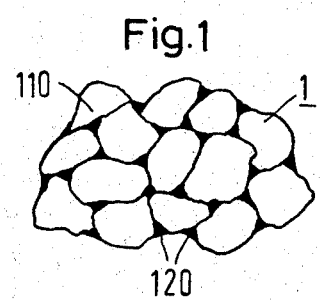
FIG. 1 is a greatly enlarged representation of a smooth polycrystalline body produced according to our invention.

Referring more particularly to FIG. 1, the layer or body 1 is made up of silicon crystals 110 between which are embedded particles 120 of silicon carbide.

As a result of the simultaneous precipitation of silicon and silicon carbide the result is that the silicon crystals which precipitate are prevented from further growing by the silicon carbide filler particles or the particles of carbon which precipitate with the silicon carbide, without, however, disadvantageously affecting the physical properties of the precipitated silicon. The silicon crystals are very small and moreover, their crystallographic orientation is entirely random so that in the layers a crystallographically dependent anisotropy of some physical properties is practically impossible. The grain boundary effect, which is normally observed in silicon layers obtained by the evaporation on a normal base, which effects are extraordinarily troublesome, are avoided by the smooth polycrystalline silicon layers produced according to our invention. These layers are very shiny and exhibit from the macroscopic standpoint a practically isotropic appearance.

The ratio of silicon to silicon carbide and/or carbon is approximately between about 100:1 and 50:1. The grain size of the silicon crystals amounts to about $10^{-5}$ to $10^{-7}$ cm. The grain size of the silicon carbide particles is correspondingly smaller, for example by a factor of about 5.

Figure 2:
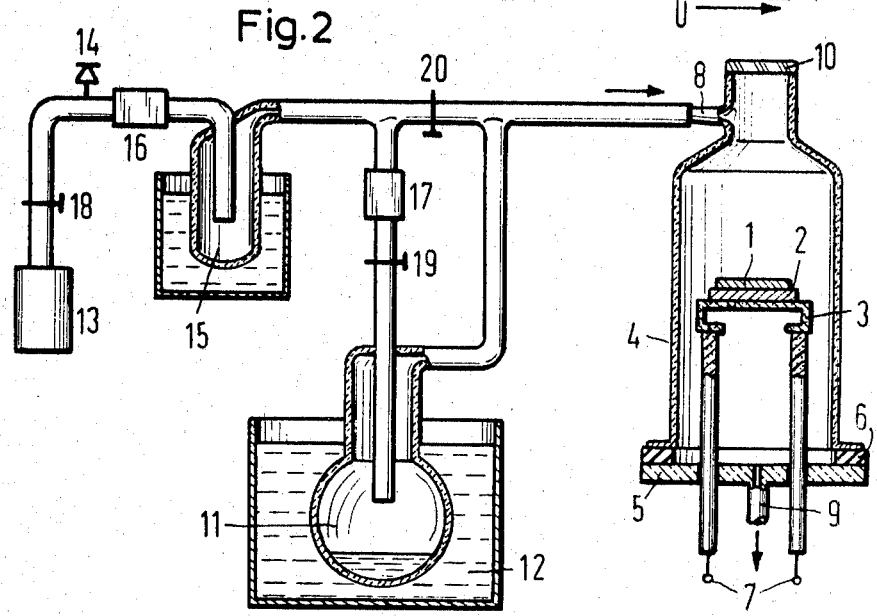
FIG. 2 is a diagrammatic representation of an apparatus for carrying out the method of our invention.

As shown in FIG. 2, a suitable base 2 on which the layer is to be deposited, for example a disc of apparatus procelain, is arranged on a heating table 3, which is heated to a temperature of about 1050° C. The base should be chosen such that its thermal expansion coefficient is approximately that of the layer to be precipitated thereon. It is also necessary that the material of the base be resistant at the reaction temperature, that is neither the reaction gases nor the remaining gases should attack it under the conditions of the reaction. The heating table 3 with the base 2 thereon is arranged in a reaction vessel 4 made out of quartz. The metal base 5 forms the bottom closure of the vessel, which is advantageously provided with water cooling (not shown in the drawing). A sealing ring 6 is provided for sealing of the vessel. The heating table 3 is conencted to a suitable source of current by means of the leads 7 which pass through and are insulated by the base 5. The pipes 8 and 9 serve to conduct the reaction mixture into the chamber and to carry off the residual gas from the chamber. As upper closure of the reaction vessel there is used a smoothly ground plate 10, which permits the pyrometric measurement of the temperature of the base 2 or of the growing layer 1.

The reaction gas which enters the reaction vessel through the pipe 8, for example a mixture of hydrogen and a carbon- and silicon-containing halogen compound, such as $CH_3SiHCl_2$, is decomposed in the reaction vessel 4. Instead of hydrogen as carrier gas, in similar manner an inert gas or a mixture of hydrogen and inert gas can be used. A thin layer 1 of smooth polycrystalline silicon precipitates on the base 2 by decomposition of the reaction gas. This layer, upon considerable magnification, exhibits the appearance shown in FIG. 1.

A silicon- and carbon-containing halogen compound, such as $CH_3SiHCl_2$, in liquid condition, is found in the evaporation vessel 11. The degree of evaporation of this compound is increased by the temperature of the heating bath 12. The hydrogen which is conducted from the stock vessel 13 through a safety valve 14 and the cooling chamber 15 is mixed with the halogen compound vapors coming from the evaporator vessel 11. The amounts of the utilized gases are determined by the flow meters 16 and 17.

The adjustment of volume ratio can either be accomplished by the adjustment of the temperature of the evaporator vessel or by adjustment of the valves 18, 19 and 20. Of course the adjustment of the volume ratio can also be achieved by changing of the absolute throughput of the hydrogen or of the inert gas used as carrier gas. A volume ratio of 10 to 100 parts of hydrogen (or carrier gas) to the halogen compound such as $CH_3SiHCl_2$, has been found to be most advantageous.

Figure 3:
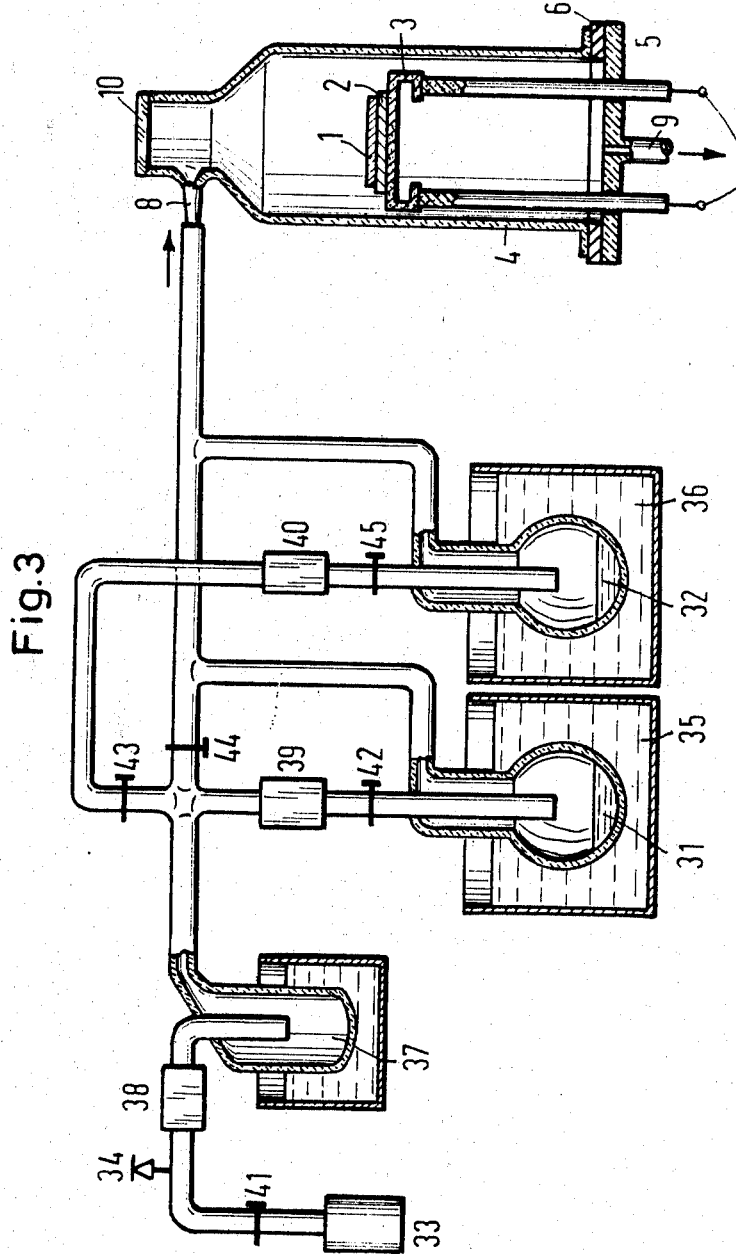
FIG. 3 is a diagrammatic representation of another arrangement for carrying out the method of our invention.

The arrangement of FIG. 3 corresponds in general to the arrangement of FIG. 2. However, when using a mixture of silicon and carbon halides or halohydrides, instead of a carbon- and silicon-containing halogen compound, as is used in the example described in connection with FIG. 2, it is advantageous to provide an additional evaporator for the production of the reaction gas mixture.

Upon the use of mixtures whose components do not differ considerably from each other in gaseous phase, such as $SiHCl_3/CH_2Cl_2$; or $SiCl_4/CHCl_3$; or $SiBr_4/CHBr_3$, it is possible to use a single evaporator for the conversion thereof into the vapor phase.

If, for example, a reaction gas is used consisting of a mixture of hydrogen, $SiHCl_3$ and $CH_2Cl_2$ in a volume ratio of 150:10:1, it is advantageous to achieve the evaporation by means of two separate evaporators 31 and 32. The $SiHCl_3$ is found in evaporator 31, and the $CH_2Cl_2$ in evaporator 32, both in liquid condition. By adjustment of a predetermined bath temperature in vessels 35 and 36, the halogen compound evaporate, are mixed with the hydrogen coming from the stock vessel 33 through the safety valve 34 and the cooling vessel 37, and pass through the pipe 5 into the reaction vessel 4. The amount of the evaporated halogen compound is regulated by adjustment of the evaporation temperatures. The measurement of the speed of flow of the reaction gases is accomplished by flow meters 38, 39 and 40. In this example it has been found advantageous to adjust the speed of flow to about 1 liter per minute. By adjustment of the valves 41, 42, 43, 44 and 45, as well as by adjustment of the speed of flow of the hydrogen, it is possible to vary the volume ratio.

The reaction gas which enters the reaction vessel 4 through the pipe 8 is decomposed on the heated base 2, the temperature of which is pyrometrically determined. As a result of the precipitation, a thin, shiny layer of polycrystalline silicon having the appearance shown in FIG. 1, is formed. The precipitation temperature in this example is 1150° C. At this temperature, the precipitation of silicon carbide markedly starts to occur under the given reaction conditions. As a result, finely divided particles of silicon carbide are separated simultaneously with the silicon, these fine particles of silicon carbide interfering with the growth of the primary precipitating silicon crystals. In this manner, the random arrangement of the silicon crystals is maintained so that the obtained material does not exhibit any particular crystallographic orientation, whereby the physical properties of the obtained silicon are independent of the macroscopic arrangement. By the addition of a dopant or a compound thereof to the reaction gas, it is possible to modify the electrical properties of the obtained layer in desired manner.

It is possible according to our invention to use not only the compounds previously obtained but also other silicon- and carbon-containing compounds or mixtures of silicon and carbon halogen compounds. Instead of hydrogen as the carrier gas it is possible to use any gas inert to the materials, particularly a noble gas. It is most important according to our invention that the reaction conditions be so adjusted that simultaneously with the precipitation of the silicon there is also precipitated small amounts of silicon carbide. The amount of silicon carbide should not be greater than up to about 2% of the silicon and is preferably between about 1 and 2%. This can be adjusted by adjustment of the composition of the reaction gases, by adjustment of the precipitation temperature, etc.

Practically any material which is resistant to the separation temperature and to the reactants under the conditions of the reaction, can be used as base for the formation of the polycrystalline layer thereon. It is of course preferred that the expansion coefficient of the base be approximately that of the expansion coefficient of the precipitated silicon.

For the production of doped layers, it is advantageous to add a dopant to the reaction gas in suitable concentration. By precipitating from a gas mixture of hydrogen and $CH_3SiHCl_2$ in a ratio of 50:1 to 100:1, there is obtained by an addition of 0.1% of $PCl_3$ (calculated with respect to the $CH_3SiHCl_2$) an n-doped layer with a specific resistance of $\rho=5$ ohm cm. The separation is accomplished at a temperature of 1100° C., while maintaining a flow speed of 1 liter per minute. A slitted disc made of apparatus porcelain is used as the carrier. The expansion coefficient of the apparatus porcelain amounts to $3-4 \times 10^{-6}$° C.

The determination of the carrier charge concentration from the Hall effect for the layer produced in the above example gives a value of $n=5 \times 10^{15} \cdot cm.^{-3}$. This value corresponds to a specific resistance of $\rho=1$ ohm cm. From this it is clear that the deviation as compared to the measured value of $\rho=5$ ohm cm. is relatively slight. The influence of the grain size on the specific resistance is therefore not important.

Figure 4:
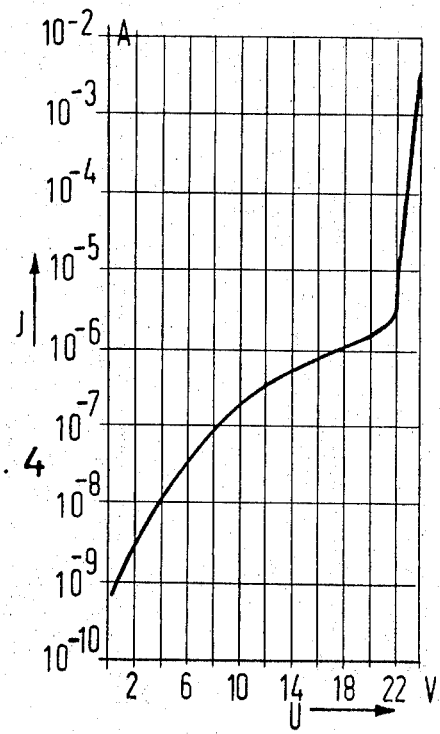
FIG. 4 is a semi-logarithmic graph showing the characteristics of a diode produced according to our invention.

The characteristics of a diode (laboratory sample) produced according to our invention are given in semi-logarithmic form in the graph of FIG. 4 which shows a doping of $4.6 \times 10^{16}$ impurity atoms$\times cm.^{-3}$ in n-zone, and $5 \times 10^{17}$ impurity atoms$\times cm.^{-3}$ in p-zone. The breakthrough voltage amounts to 23 v., the blocking current at half breakthrough voltage $2.3 \times 10^{-7}$ A, and the current density at half breakthrough voltage amounts at a diode surface of 0.72 mm. $3.2 \times 10^{-7}$ A/mm.$^2$.

We claim:

1. A smooth, polycrystalline body, comprising a plurality of randomly oriented silicon crystals with spaces therebetween, and particles of at least one substance selected from the group consisting of silicon carbide and carbon in the spaces so that the surface of said polycrystalline body is smooth and uninterrupted and is partly made up of exposed faces of said silicon crystals and partly made up of said particles of said substance embedded between said silicon crystals, the physical and chemical properties in macroscopic regions being independent of the direction.

2. Polycrystalline body of claim 1 wherein the ratio of silicon to said particles of said substance is between about 100: 1 and 50:1.

3. Polycrystalline body according to claim 2 in which the grain size of said silicon crystals is between about $10^{-5}$ and $10^{-7}$ cm., and the grain size of said particles of said substance is smaller by a factor of about 5.

4. Polycrystalline body according to claim 1 in which the grain size of said silicon crystals is between about $10^{-5}$ and $10^{-7}$ cm., and the grain size of said particles of said substance is smaller by a factor of about 5.

5. Method of producing smooth, polycrystalline bodies primarily of silicon, which comprises simultaneously precipitating onto a hot base silicon and at least one substance selected from the group consisting of silicon carbide and carbon from a reaction gas under conditions of temperature and concentration of reactants in the reaction gas such that the simultaneously precipitated substance constitutes not more than up to about 2% of the precipitated silicon, whereby the silicon precipitates on the base as randomly oriented silicon crystals with spaces therebetween and particles of said substance fill the spaces therebetween, resulting in a smooth, uninterrupted surfaced polycrystalline body partly made up of exposed faces of said silicon crystals and partly made up of said particles of said substance embedded between the crystals.

6. Method of producing smooth, polycrystalline bodies primarily of silicon, which comprises contacting a hot base with a reaction gas comprising carbon, silicon and halogen and a carrier gas inert thereto at a temperature and at a concentration of the reactants in the reaction gas such that silicon and at least one substance selected from the group consisting of silicon carbide and carbon simultaneously precipitate onto said base, the precipitated substance constituting not more than up to about 2% of the precipitated silicon, whereby the silicon precipitates on the base as randomly oriented silicon crystals with spaces therebetween and particles of said substance fill the spaces therebetween, resulting in a smooth, uninterrupted surfaced polycrystalline body partly made up of exposed faces of said silicon crystals and partly made up of said particles of said substance embedded between the crystals.

7. Method according to claim 6 in which said reaction gas consists of said carrier gas and a carbon-silicon-halogen compound.

8. Method according to claim 6 in which said reaction gas consists of said carrier gas and a substance selected from the group consisting of silicon halides and silicon hydrohalides plus a substance selected from the group consisting of carbon halides and carbon hydrogen halides.

9. Method according to claim 6 in which said reaction gas consists of said carrier gas and $CH_3SiHCl_2$.

10. Method according to claim 9 in which the silicon-containing compound is present in an amount about 4 times the amount of the carbon-containing compound.

11. Method according to claim 6 in which said reaction gas consists of said carrier gas and a mixture of $SiHCl_3$ and $CH_2Cl_2$.

12. Method according to claim 11 in which the amount of $SiHCl_3$ is about 10 times the amount of said $CH_2Cl_2$.

13. Method according to claim 6 in which said hot base is made up of a material selected from the group consisting of porcelain, corundum, quartz glass, molybdenum, tantalum, silicon and silicon carbide.

14. Method according to claim 6 in which the carrier base is subsequently chemically removed from the polycrystalline body precipitated thereon.

15. Method according to claim 6 in which the temperature is maintained between about 1000° C. and 1200° C.

References Cited

UNITED STATES PATENTS 3,157,541  11/1964  Heywang et al. _____ 117—106 X

WILLIAM L. JARVIS, Primary Examiner

U.S. Cl. X.R.

117—106, 201; 252—62.3, 502, 504; 264—81, 105, 317